US 9,123,069 B1

(12) United States Patent
Haynes et al.

(10) Patent No.: US 9,123,069 B1
(45) Date of Patent: Sep. 1, 2015

(54) MOVING TRANSACTION DETAILS FORWARD IN BUYING PROCESS

(75) Inventors: Jeremy S. Haynes, Seattle, WA (US); Frederick J. Werbel, Sammamish, WA (US); Felix F. Anthony, Issaquah, WA (US); J. Gray Sandridge, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 224 days.

(21) Appl. No.: 12/029,310

(22) Filed: Feb. 11, 2008

(51) Int. Cl.
G06Q 30/00 (2012.01)
G06F 17/30 (2006.01)
G06Q 30/06 (2012.01)

(52) U.S. Cl.
CPC .................................. *G06Q 30/0625* (2013.01)

(58) Field of Classification Search
USPC .................................... 705/26–27, 26.1–27.2
See application file for complete search history.

(56) References Cited

U.S. PATENT DOCUMENTS

| 5,960,411 A * | 9/1999 | Hartman et al. ................. 705/26 |
| 6,456,981 B1 | 9/2002 | Dejaeger et al. |
| 7,315,830 B1 * | 1/2008 | Wirtz et al. ..................... 705/26 |
| 7,933,895 B2 | 4/2011 | Amjadi |
| 2001/0014868 A1 | 8/2001 | Herz et al. |
| 2001/0044868 A1 | 11/2001 | Roztocil et al. |
| 2002/0042750 A1 * | 4/2002 | Morrison ........................ 705/26 |
| 2002/0055878 A1 * | 5/2002 | Burton et al. ................... 705/26 |
| 2002/0111879 A1 * | 8/2002 | Melero et al. .................. 705/26 |
| 2002/0152135 A1 * | 10/2002 | Beeri et al. ..................... 705/27 |
| 2002/0172520 A1 | 11/2002 | Suyehira |
| 2003/0040969 A1 | 2/2003 | O'Hagan et al. |
| 2003/0139979 A1 | 7/2003 | Moore |
| 2003/0149603 A1 | 8/2003 | Ferguson et al. |
| 2004/0254839 A1 | 12/2004 | Nishimura |
| 2005/0137938 A1 | 6/2005 | Meyer et al. |
| 2006/0015404 A1 | 1/2006 | Tran |
| 2006/0074769 A1 | 4/2006 | Looney et al. |
| 2006/0095325 A1 | 5/2006 | Bell et al. |
| 2006/0137938 A1 | 6/2006 | Hayes |
| 2006/0238307 A1 | 10/2006 | Bauer et al. |
| 2006/0265508 A1 | 11/2006 | Angel et al. |
| 2006/0277103 A1 * | 12/2006 | Fujita et al. ..................... 705/14 |
| 2007/0174259 A1 | 7/2007 | Amjadi |

(Continued)

FOREIGN PATENT DOCUMENTS

| WO | WO0062231 A1 | 10/2000 |
| WO | WO2004077330 A1 | 9/2004 |
| WO | WO2008083371 A1 | 7/2008 |

OTHER PUBLICATIONS

Amazon http://www.amazon.com/ Internet Archive (Nov. 6, 2007)—http://web.archive.org/web/20071106152322/http://www.amazon.com/.*
eBay http://www.ebay.com/ Internet Archive (Oct. 18, 2007)—http://web.archive.org/web/20071018062456/http://www.ebay.com/.*

(Continued)

*Primary Examiner* — Kathleen Palavecino
(74) *Attorney, Agent, or Firm* — Lee & Hayes, PLLC

(57) ABSTRACT

Online transactions are streamlined by moving pertinent transaction information forward in the buying process, so that a customer has the information when actually making a buying decision. In some implementations, a process may include generating a queue of items from previous purchase requests by a user, and presenting the queue of items on a page associated with an item available for purchase, such as an item detail page or search results page. Along with the queue, a fully landed cost of the items in the queue, may be presented on the page.

29 Claims, 17 Drawing Sheets

(56) References Cited

U.S. PATENT DOCUMENTS

| | | | |
|---|---|---|---|
| 2007/0203821 A1* | 8/2007 | DuFour | 705/37 |
| 2007/0288328 A1* | 12/2007 | Moon et al. | 705/26 |
| 2007/0294341 A1* | 12/2007 | Shah et al. | 709/203 |
| 2008/0052177 A1* | 2/2008 | Walker et al. | 705/21 |
| 2008/0065490 A1 | 3/2008 | Novick et al. | |
| 2008/0114647 A1 | 5/2008 | Singer et al. | |
| 2008/0120199 A1* | 5/2008 | Pirnack et al. | 705/27 |
| 2008/0140577 A1* | 6/2008 | Rahman et al. | 705/71 |
| 2008/0183593 A1* | 7/2008 | Dierks | 705/26 |
| 2009/0063287 A1* | 3/2009 | Tribout et al. | 705/26 |
| 2009/0125411 A1 | 5/2009 | Otto et al. | |
| 2009/0327140 A1* | 12/2009 | Kuo | 705/71 |
| 2010/0020602 A1 | 1/2010 | Baek et al. | |
| 2010/0030602 A1 | 2/2010 | Caswell | |
| 2013/0073372 A1 | 3/2013 | Novick et al. | |

OTHER PUBLICATIONS

Abad Peiro, ,J.L., Asokan, N., Steiner, M., & Waidner, M. (1998). Designing a generic payment service. IBM Systems Journal,37(1), 72-88. Retrieved from http://search.proquest.com/docview/222417702?accountid=14753.*

Office action for U.S. Appl. No. 12/029,302, mailed on Aug. 29, 2013, Haynes et al., "Item-By-Item Purchasing," 28 pages.

Office action for U.S. Appl. No. 12/029,302, mailed on May 26, 2011, Haynes et al, "Item-By-Item Purchasing," 24 pages.

Office action for U.S. Appl. No. 12/029,302, mailed on Dec. 16, 2013, Jeremy S. Haynes, "Item-By-Item Purchasing," 29 pages.

Final Office Action for U.S. Appl. No. 12/029,302, mailed on Nov. 18, 2011, Haynes et al, "Item-By-Item Purchasing," 21 pages.

Office Action for U.S. Appl. No. 12/029,302, mailed on Oct. 27, 2014, Jeremy S. Haynes, "Item-By-Item Purchasing", 29 pages.

* cited by examiner

1200

Athletic Jersey Shirt http://www.website.com/ShirtProductPage

Athletic Jersey Shirt
Our Price: $22.95

[Buy Now] — 1202

Size: Small — 1204

Larger View   Color: Crimson/Grey

Item Description: Athletic jersey shirt available in your favorite team's colors ...

Product Details
Sizes: S, M, L, XL, XXL
Colors: Crimson/Grey, Purple/White, Green/Gold, Orange/Yellow

Customer Reviews
This is my favorite shirt ever! I wear it to all my favorite ....

1206

Cost of Queue: $124.76

Items (4):
- Harry Potter 3
- State U jersey
- Tom Petty CD
- Athletic Jersey

Paid by: VISA - 9321

Arrives on: Sept 3

Ships to: JH – Seattle

⊞ More options

MOVING TRANSACTION DETAILS FORWARD IN BUYING PROCESS

BACKGROUND

Many online merchants employ a "build-up and buy" shopping experience, in which a customer chooses multiple potentially unrelated items to purchase. The items are aggregated into a shopping cart and then, when the customer is finished shopping, all of the items are purchased at once in a single checkout transaction. The electronic shopping cart and checkout processes are meant to parallel those used in a conventional bricks and mortar store. One reason for such an arrangement is to ensure that customers feel as comfortable as possible with the online transaction. In the early days of e-commerce, customers were not accustomed to buying online. Thus, where possible it made sense to provide physical world metaphors for the buying process (e.g., virtual shelves, shopping baskets, and a check stand) to help facilitate the move from the physical world to the online world.

With such a shopping cart/checkout arrangement, there are two distinct phases: shopping and buying. During the shopping phase, customers browse the site and build up a group of items they would like to purchase (by adding the items to the shopping cart). Once that phase is finished, the customer navigates to a checkout page and buys all of the items at once by moving through the checkout. The separate shopping cart and checkout processes ensure that customers are given a strong decision point right before making their purchase. However, this "build up and buy" approach does not actually reflect how most people make their buying decisions. Typically, consumers decide to buy an item at the point where the item is placed into their shopping cart, not at the checkout.

Today, customers are significantly more comfortable shopping online than they were in the past. Most customers no longer need physical world metaphors to feel comfortable shopping online, and instead demand faster, more streamlined buying processes.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

FIG. 12 is a schematic diagram of yet another illustrative item detail page associated with yet another item available for purchase, the item detail page including an item queue presenting information after selection of the "buy now" button.

FIG. 13 is a schematic diagram of an illustrative search results page, with a purchase preview presented alongside search results.

DETAILED DESCRIPTION

Overview

Figure 1:
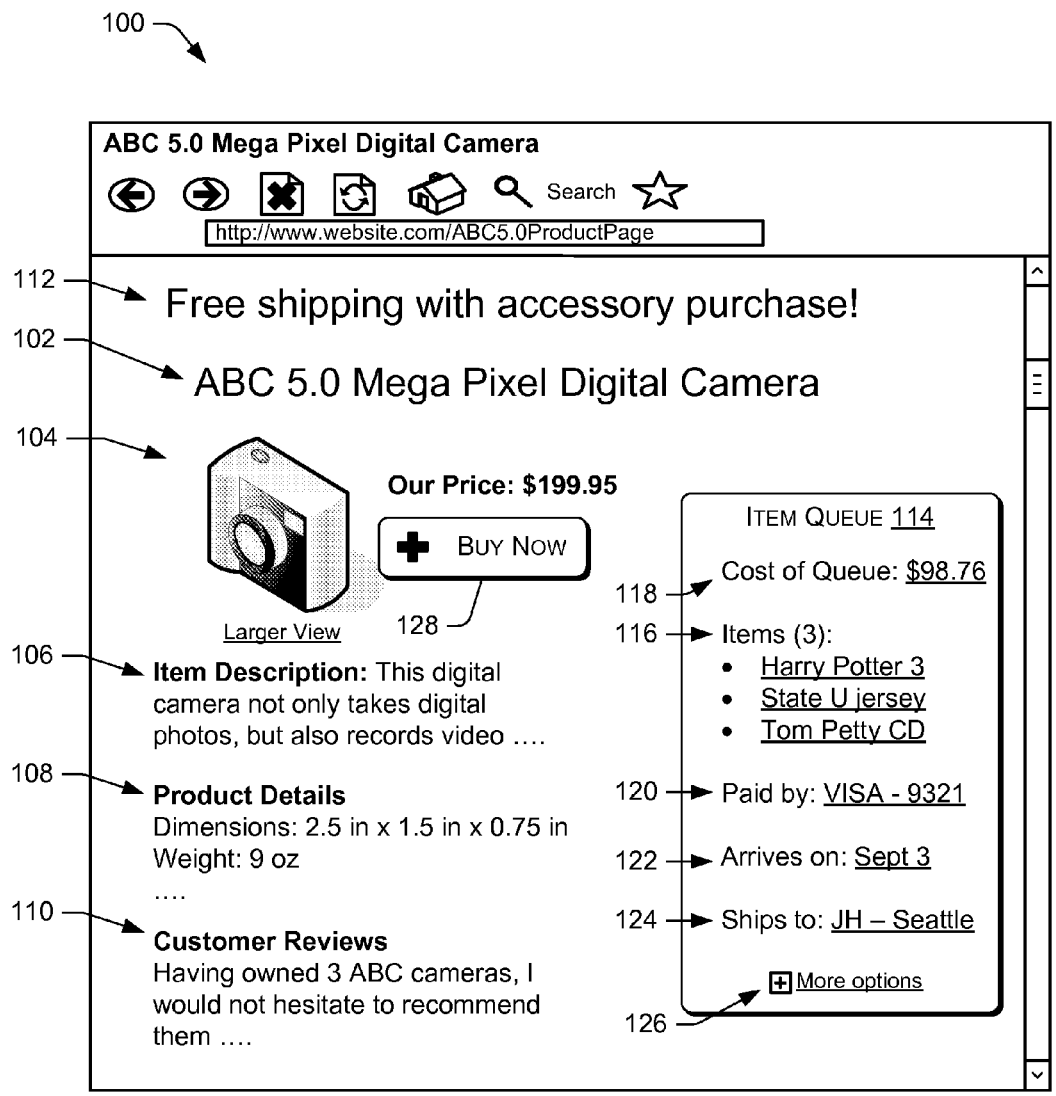
FIG. 1 is a schematic diagram of an illustrative item detail page associated with an item available for purchase, the detail page including an item queue of items for which a purchase request has previously been received.

As mentioned above, customers today are significantly more comfortable shopping online than they were in the past. Consequently, they do not need the real world metaphors of a shopping cart and a checkout. Rather, many consumers would prefer the simplicity and speed of purchasing items iteratively. However, most customers still want the ability to review and confirm their buying decision before placing an order.

This disclosure describes a variety of ordering techniques that provide simpler and faster online shopping, while still allowing users to review and confirm their buying decisions prior to placing an order.

In one aspect, online transactions are streamlined by moving pertinent transaction information forward in the buying process, so that a customer has the information when actually making a buying decision for each item. Such transaction information may include a list or queue of previous purchases, a total cost of the item including tax, shipping costs, and any applicable promotions, an arrival date, a shipping address, a source of payment, a billing address, etc. Typically, the items in the item queue include items from previous unfulfilled purchase requests. However, in some instances, items from previous fulfilled purchase requests may additionally or alternatively be included.

In some implementations, a queue of items from previous purchase requests is generated and presented on an item detail, a search results page, or another page associated with an item available for purchase. The item queue includes a fully landed cost of the items in the queue or a "cost of queue". Thus, upon viewing the page having the item queue, a user may make an informed decision whether to purchase the item. If the user chooses to buy the item, he or she may complete the transaction by simply selecting a "buy" button or other purchase interface presented on the page.

Before choosing to buy the item, the user may view a purchase preview of what the queue would look like if the item were added to the queue. The purchase preview may, in some instances, be generated in response to a user hovering a pointer over the "buy now" button.

The foregoing techniques move transaction information forward in the buying process, so that a customer has the information he or she needs to when actually making a buying decision. In addition, items may be purchased while the user is shopping in a very simple manner.

While implementations of the present disclosure are described in the context of online purchases of items from an e-commerce merchant, the techniques described herein are applicable to any transactions involving items over a network such as the Internet. As an overview, items may include products, services, sellable units, user profiles, customer-created content (e.g., artwork), or anything else for which a transaction may be completed remotely.

"Purchasing" or "ordering" an item may include both permanent (e.g., assignments, sales, etc.) and temporary transactions (e.g., rentals, leases, etc.), as well as transfers of all (e.g., assignments, sales, etc.) or less than all of one's rights (e.g., licenses). A "purchase request" for an item is recognized when a user manifests an intention to purchase an item by, for example, selecting a "buy now" button or other purchase interface.

Illustrative Ordering Experience

FIGS. 1-13 depict an illustrative ordering experience, in which pertinent transaction information is pushed forward in the buying process, so that a customer has the information when actually making a buying decision. For example, information needed to make a buying decision may be made available on the detail page of an item offered for sale. In this way, users may browse and purchase items on an item-by-item basis, without sacrificing the ability to review and confirm their buying decision before placing an order. A queue of items previously ordered by the customer may be presented on the item detail page, along with a fully landed cost of the items in the queue. This allows the customer to readily see how purchasing an item may affect previous purchase requests, and eliminates the complex, multi-step processes previously required for most online transactions.

FIG. 1 is a schematic view of an illustrative page 100 associated with an item available for purchase. In this implementation, the page 100 comprises an item detail page that is primarily associated with a single item available for purchase (as opposed to a checkout page, index page, tag page, forum page, search results page, or other page that may be associated with multiple items). The item detail page 100 is shown as it would be viewed by a user via a web browser. The information presented in the item detail page may vary depending on, among other things, the merchant, the type of item associated with the detail page, and the type of transaction. In FIG. 1, the detail page 100 corresponds to a digital camera available for purchase from an online merchant catalog via a merchant web site.

The illustrated detail page 100 includes an item title 102 ("ABC 5.0 Mega Pixel Digital Camera"), one or more item pictures 104, an item description 106, item specifications or details 108, one or more customer reviews 110, and a promotional offer 112 ("Free shipping with accessory purchase!"). In other implementations, detail pages may include any combination of the foregoing and/or other information.

The detail page 100 also includes an item queue 114 presenting a list of previously purchased items and pertinent transaction information about the purchase of those items. The transaction information may include any information a user might consider useful in deciding whether or not to add another item to the item queue. Without limitation, some examples of transaction information that may be presented include a total cost of the queue including tax, shipping costs, and any applicable promotions, an arrival date, a shipping address, a source of payment, a billing address, gift options, item options (e.g. model, size, color, etc.), warranty information, shipping mode, insurance, accessories, and related items, among other things.

In FIG. 1, the item queue 114 is shown to include a list 116 of items in the queue, and line items for a total cost of the items in the queue or "cost of queue" 118, a source of payment 120, an arrival date 122, shipping information 124, and a link 126 to more options. While in this implementation the item queue is shown and described as being presented in a field in the browser, in other implementations, the item queue may be presented directly on the detail page, overlaid on the detail page, in a separate queue page, in a separate frame on the page, or in any other suitable presentation format.

The detail page 100 also includes a purchase interface 128, by which a user can complete the purchase or other transaction. In the illustrated example, the purchase interface comprises a "buy now" button 128, which may be selected by a user clicking on the button. However, in other implementations, any other suitable purchase interface (e.g., button, link, drop down menu, check box, etc.) may instead by used, and may be actuated by any suitable actuation method (e.g., clicking, selection by a pointing device, hovering over, etc.). The purchase interface may be a part of the item queue 114, or may be a separate interface on the item detail page, as illustrated in FIG. 1.

In some instances, it may desirable to display a preview of what the queue would look like if the current item (i.e., the item on the item detail page) were added to the item queue 114. The preview could be presented in any number of different manners, but in one example, the preview may be presented using AJAX and/or other web 2.0 technologies to present the preview in response to hovering a pointer over a purchase interface.

Figure 2:
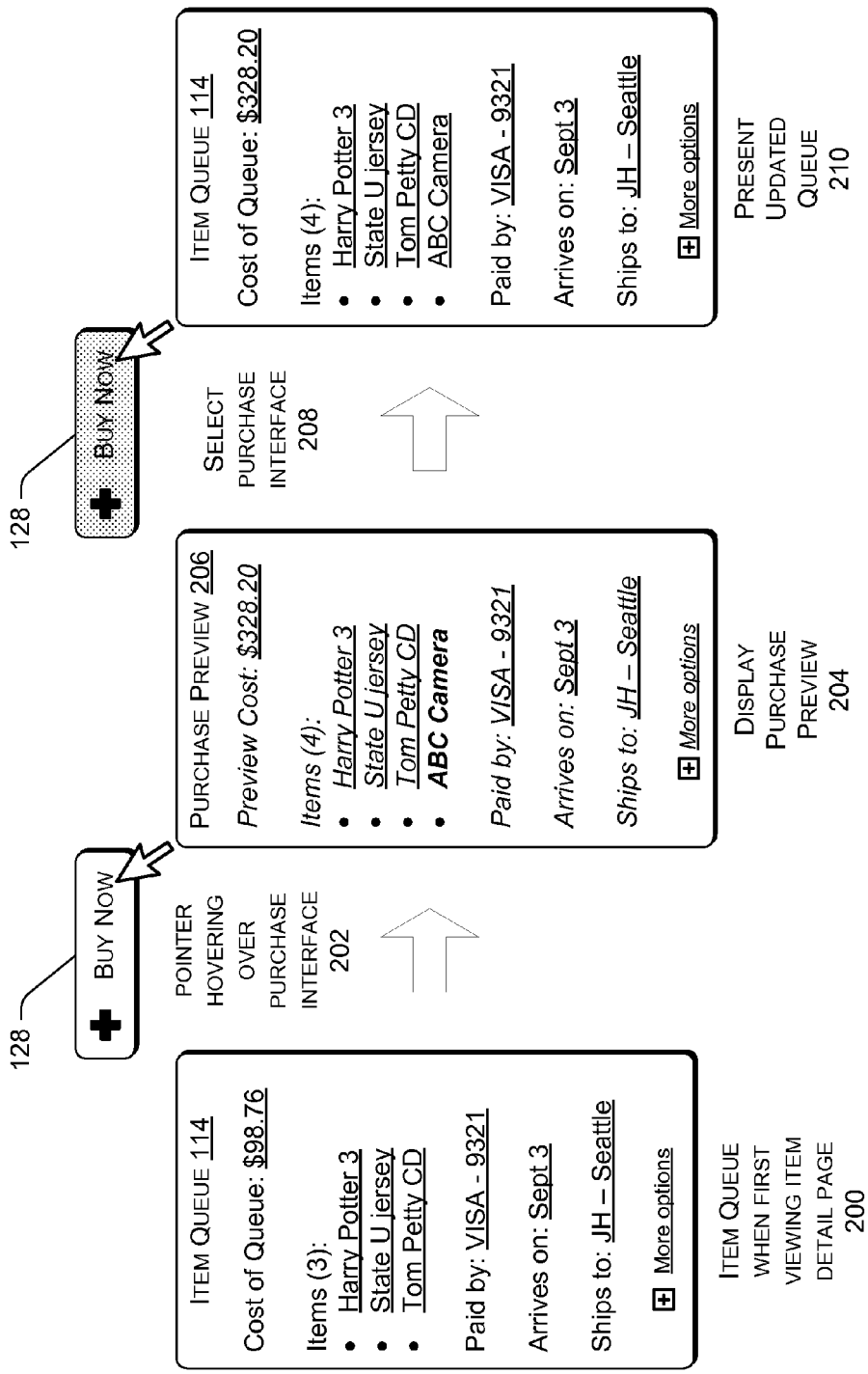
FIG. 2 is a progressive schematic diagram showing an illustrative example of an item queue before adding an item to the queue, a purchase preview displayed in response to hovering a pointer over a "buy now" button, and an item queue after the item has been added to the queue by selecting the "buy now" button.

FIG. 2 is a progressive schematic diagram illustrating how a user may navigate to an item detail page, view a preview of how purchasing an item associated with the item detail page will affect the item queue 114, and then how the queue may be updated after the purchase. Block 200 represents an item queue 114 as it would be displayed when a user navigates to a new item detail page, such as that shown in FIG. 1.

At 202, the user hovers a pointer over the purchase interface 128, which causes a purchase preview 206 to be presented. In the illustrated example, the purchase preview 206 is presented in place of the item queue 114. However, in other examples, the purchase preview 206 could be instead presented in a separate window, in a separate frame, overlaid over the item queue or a portion of the item detail page, or in any other suitable manner. In still other implementations, the purchase preview may be displayed immediately after a customer navigates to a page. That is, the purchase preview may be the default view that the customer sees when navigating to a page.

If the user desires to purchase the item, at 208, the customer makes a purchase request by selecting the purchase interface 128. At 210, the queue is updated to include the item and the cost of queue is updated to add the cost of the newly added item, and the updated queue is presented.

Because all pertinent transaction information about the queue of previously purchased items is displayed on the item detail page 100, the customer is immediately in a position to decide whether to buy the new item. The customer may view a purchase preview 206, to aid the customer in deciding whether to purchase the new item. The values for shipping information, arrival date (based on shipping type) and source of payment default to those the customer used in their last purchase (e.g., using cookies, asking the user to log in to the merchant website, or the like). Alternatively, the default values for shipping information, arrival date, and source of payment may vary based on the item or category of item being purchased, based on customer preset defaults, or the like. If the user is a new customer, the shipping information and method of payment will not be filled in. Where the shipping information would normally be shown, there will instead be a link (not shown) to "Enter new shipping address." Clicking, hovering over, or otherwise selecting the address section will allow the user to enter the shipping and payment information. In one example, using AJAX and/or other web 2.0 technologies, hovering a pointer over the address information field will cause a flyover to open containing fields for entering a new address. Once the customer has filled out the fields with in-line verification of the address, the flyover will close and their new address will now appear in the shipping address field. The cost of queue will update to reflect any changes in tax or shipping charges. A similar process may be used for entering a new payment source.

Looking at this page, all of the information that is important to the customer is readily available (e.g., a list of items in the queue, an identification and details of the items, when the customer will receive the items, exactly how much the items will cost, and how the customer will pay for the items). At this stage, if the customer does not wish to modify any of the transaction information, and is ready to purchase the item, he or she is in a position to do so. There are no remaining questions about the purchase in the customer's mind and he or she can simply select the "Buy Now" button 128 (or other purchase interface). A confirmation window may be displayed to inform the user that the transaction has been completed. The whole process took little thought by the customer, only one click (or other selection), and zero page transitions. During this process, the customer remained in the middle of their shopping experience on the detail page 100.

Illustrative Confirmation Window

Figure 3:
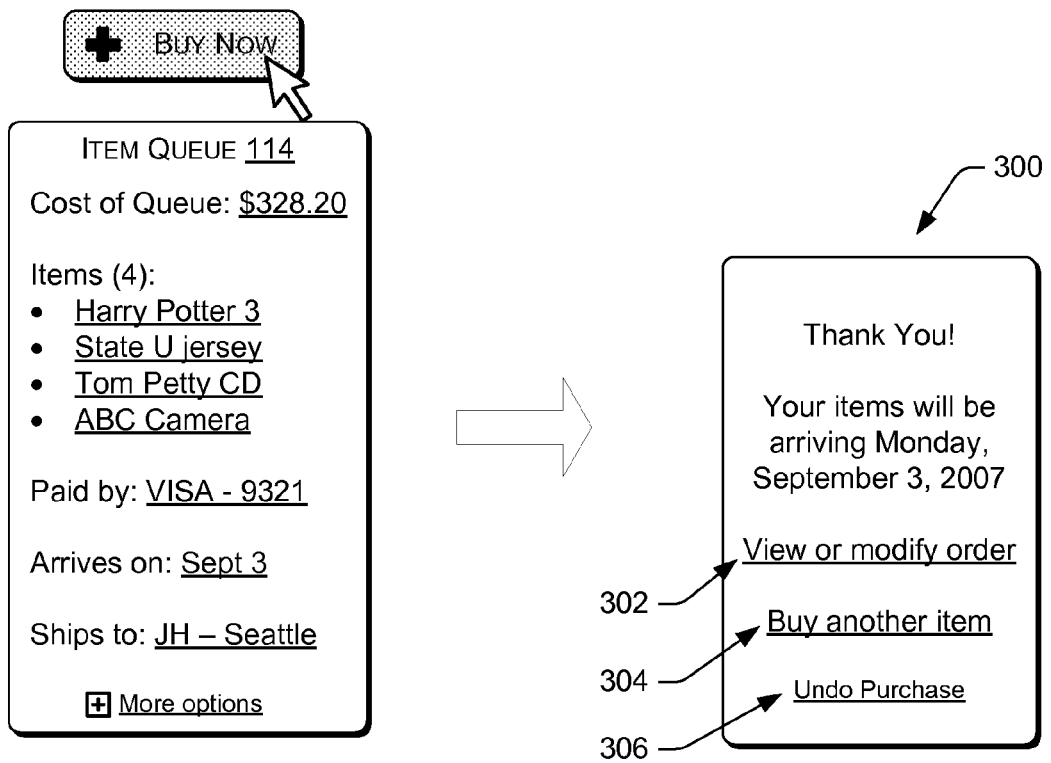
FIG. 3 is a progressive schematic diagram showing a confirmation message that in some instances may be displayed in response to user selection of the "buy now" button.

FIG. 3 is a schematic diagram of an illustrative transaction completion window 300, which may be presented following user selection of the buy now button 128. The transaction completion window 300 may replace the item queue 114, may be placed adjacent or proximate the item queue, or may be overlaid over the top thereof. The transaction completion window 300 may, for example, be displayed after selecting the purchase interface at 208 in FIG. 2, but before presenting the updated queue at 210.

The transaction completion window 300 in this implementation includes a message thanking the user for the purchase and setting an arrival date for the item. The transaction completion window 300 also may allow the user to, for example, view or modify the order (option 302), buy another item (option 304), or undo the transaction (option 306). Selection of option 302 allows the user to change portions of the transaction information, such as the shipping address, billing address, arrival date, etc. Selection of option 304 may cause the buy now button to again be displayed so the user may continue shopping. Selection of undo option 306 allows the user to cancel the order within a predetermined period of time following completion of the transaction in the case of inadvertent activation.

Illustrative Item Description Window

Figure 4:
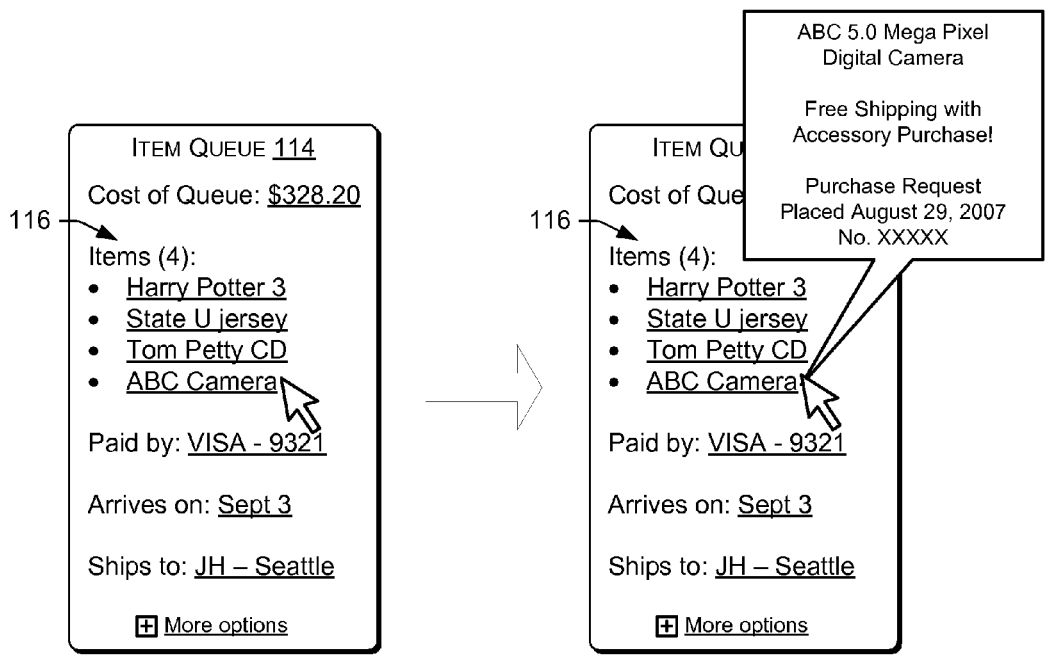
FIG. 4 is a progressive schematic diagram showing an illustrative example of additional item information that may be displayed in the item queue of FIG. 1, upon user selection of an item in the item queue.

In some instances a user may want to view additional details about items listed in the item queue 114. FIG. 4 is a progressive schematic view showing how additional details about items may be viewed. As shown in FIG. 4, when a user hovers a pointer over (or otherwise selects) one of the items in the list 116, a callout opens providing additional details about the item (e.g., description, specifications, title, author, artist, genre, etc.), any promotions applicable to the item, when the purchase request for the item was placed, an order number, and any other information pertinent to the particular item.

While in the implementation of FIG. 1 the item queue 114 is shown to include a list of items in the queue, in other implementations, the item queue 114 may simply include a number of items in the queue (e.g., four), without identifying those items. In that case, a customer may view the list of items in the queue by hovering over or otherwise selecting the number of items in the queue.

Illustrative Cost of Queue Details

Figure 5:
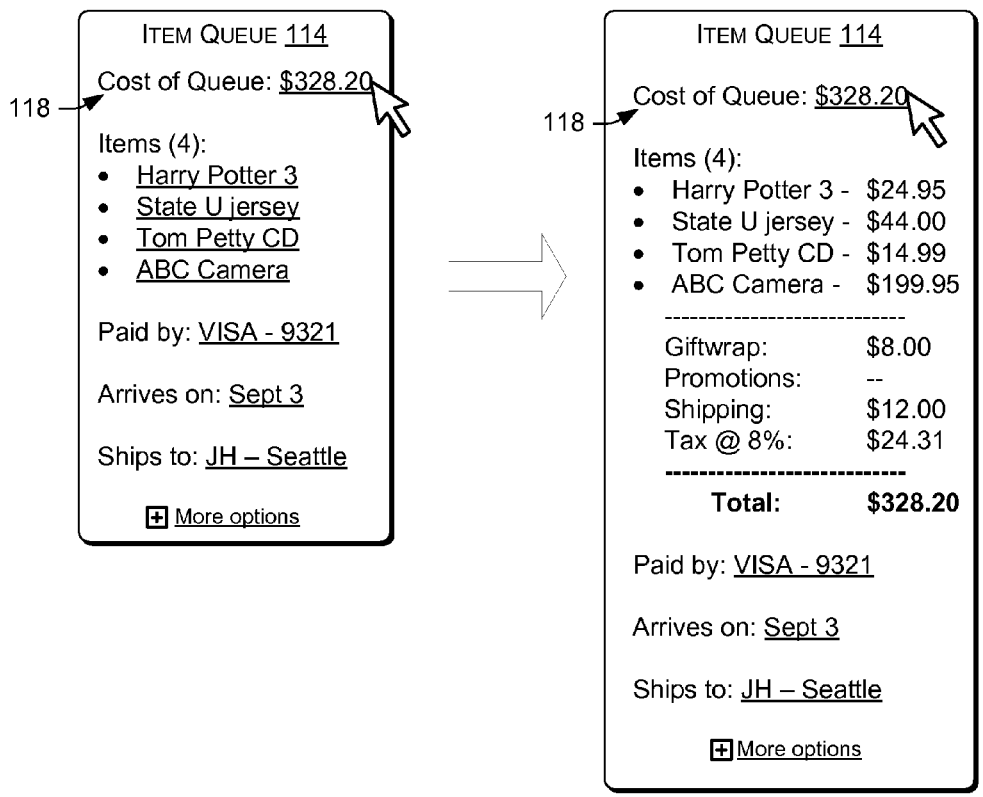
FIG. 5 is a progressive schematic diagram showing an illustrative example of information that may be shown in the item queue of FIG. 1, upon user selection of a total cost of the queue.

FIG. 5 is a schematic diagram showing details of item queue 114 following user selection of the cost of queue line item 118. When the user selects the cost of queue line item 118, a detailed summary of the cost of the items in the queue is displayed, including the list price of the items, gift wrapping, any applicable discounts or promotions, shipping charges, sales tax, and a cost of queue equal to the sum of the foregoing charges. In the illustrated example, the user has requested to purchase four items: Harry Potter 3, a State U jersey, a Tom Petty CD, and an ABC Digital Camera. Harry Potter 3 is listed at $24.95, the State U jersey is listed at $44.00, the Tom Petty CD is listed at $14.99, and the ABC Digital Camera is listed at $199.95. In addition, gift wrapping for all the items in the queue is $8.00, no promotions are applicable, shipping is $12.00, and sales tax for the items in the queue is $24.31, for a cost of queue to the user of $328.20.

Illustrative Payment Details

Figure 6:
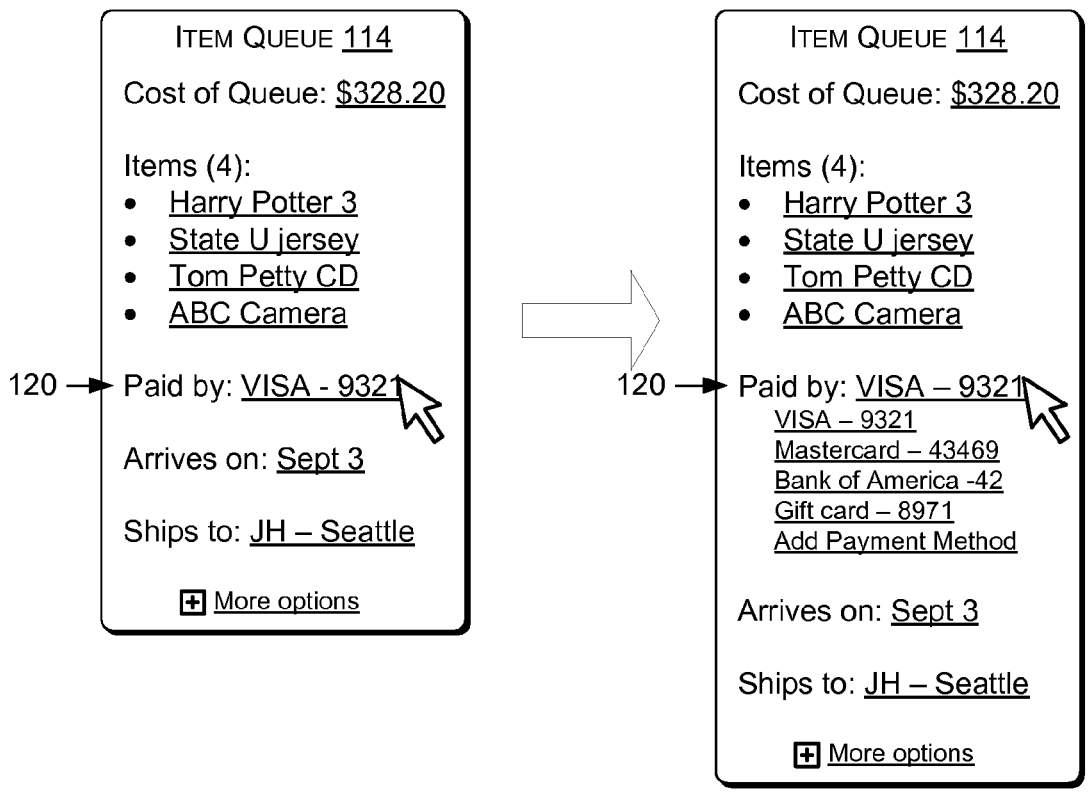
FIG. 6 is a schematic diagram showing an illustrative example of information that may be shown in the item queue of FIG. 1, upon user selection of a payment method of the queue.

FIG. 6 is a schematic diagram showing details of item queue 114 following user selection of the payment source line item 120. When the user selects the payment source line item 120, a list of available payment options is presented to the user. The available payment options include those the user has previously used on the merchant website (in this case, the user is presented with the option to use a previously stored VISA, MasterCard, Bank of America bank account, or a gift card). Other forms of payment may include a merchant credit account, other credit or debit accounts, third party payment accounts (e.g., PayPal®), or any other suitable payment option. The user may update or modify any of payment options by selecting the desired payment option (e.g., clicking or hovering over the desired payment option). The user is also given the option to add a new payment method in substantially the same manner as updating a payment option.

Illustrative Arrival Date Details

Figure 7:
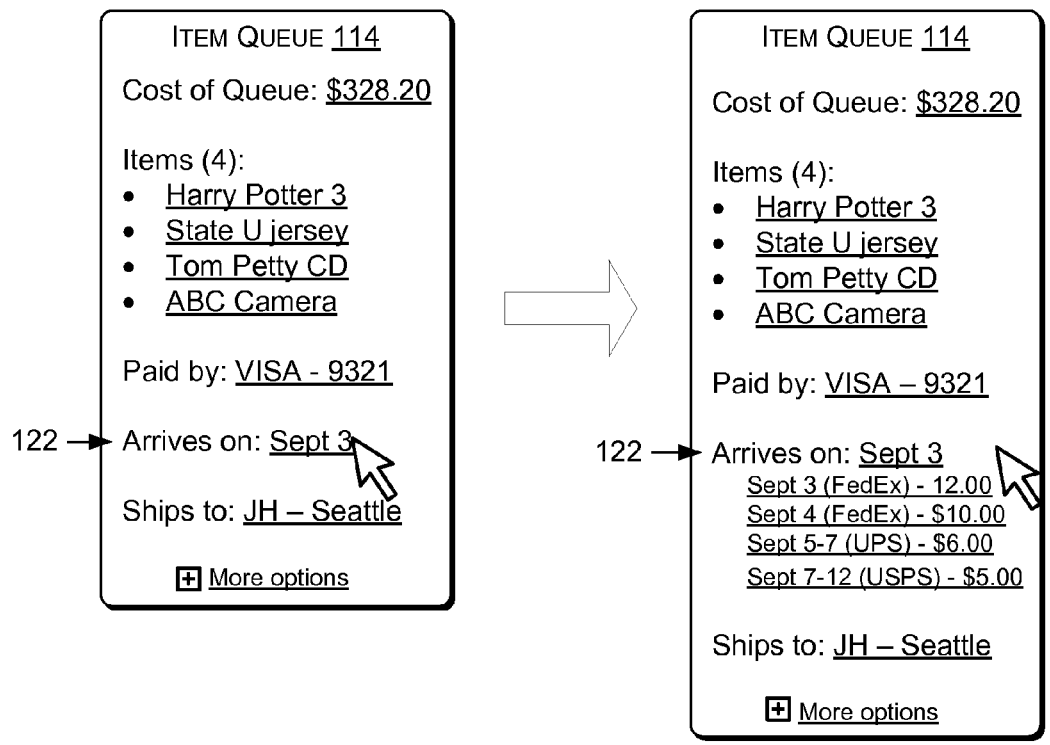
FIG. 7 is a schematic diagram showing an illustrative example of information that may be shown in the item queue of FIG. 1, upon user selection of an arrival date of the queue.

FIG. 7 is a schematic diagram showing details of item queue 114 following user selection of the arrival date line item 122. When the user selects the arrival date line item 122, a list of available arrival dates is presented to the user, along with the corresponding shipping speed, carrier, and or cost. For example, in the illustrated example, the user is given the choice of arrival dates between September 3 and September 12. If the item is to be delivered on September 3, the item will be shipped via Federal Express (FedEx) and the cost will be $12.00. If, however, the user is willing to wait until sometime between September 7 and September 12, the item can be shipped via the U.S. Postal Service (USPS) for only $5.00. The user may obtain additional details of the arrival date (e.g., time of day, insurance options, restrictions, etc.) by selecting the desired arrival date (e.g., by clicking or hovering over).

Illustrative Shipping Information Details

Figure 8:
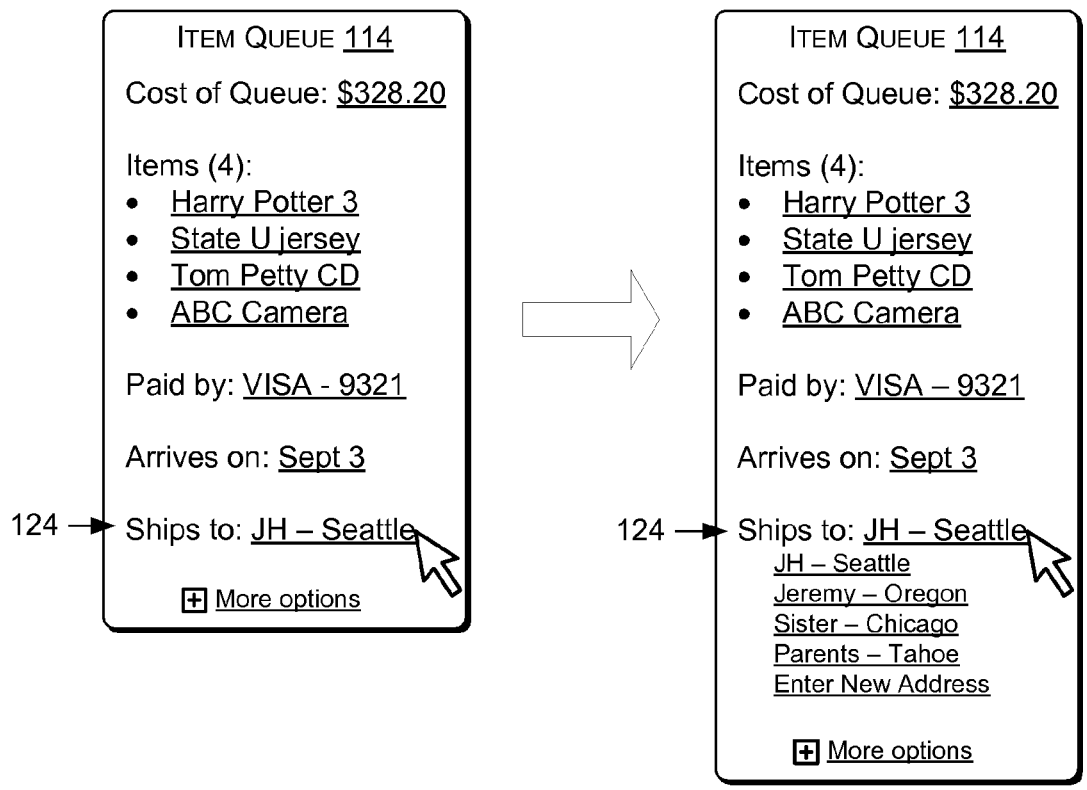
FIG. 8 is a schematic diagram showing an illustrative example of information that may be shown in the item queue of FIG. 1, upon user selection of a shipping address of the queue.

FIG. 8 is a schematic diagram showing details of item queue 114 following user selection of the shipping information line item 124. When the user selects the shipping information line item 124, the user's address book is presented including all addresses to which the user has previously had items delivered. The user may update or modify address book entries by selecting the desired entry (again by clicking or hovering over). The address book also gives the user the option to enter a new address to which to send the item in substantially the same manner used to update an address book entry.

Illustrative Examples of More Options

Figure 9:
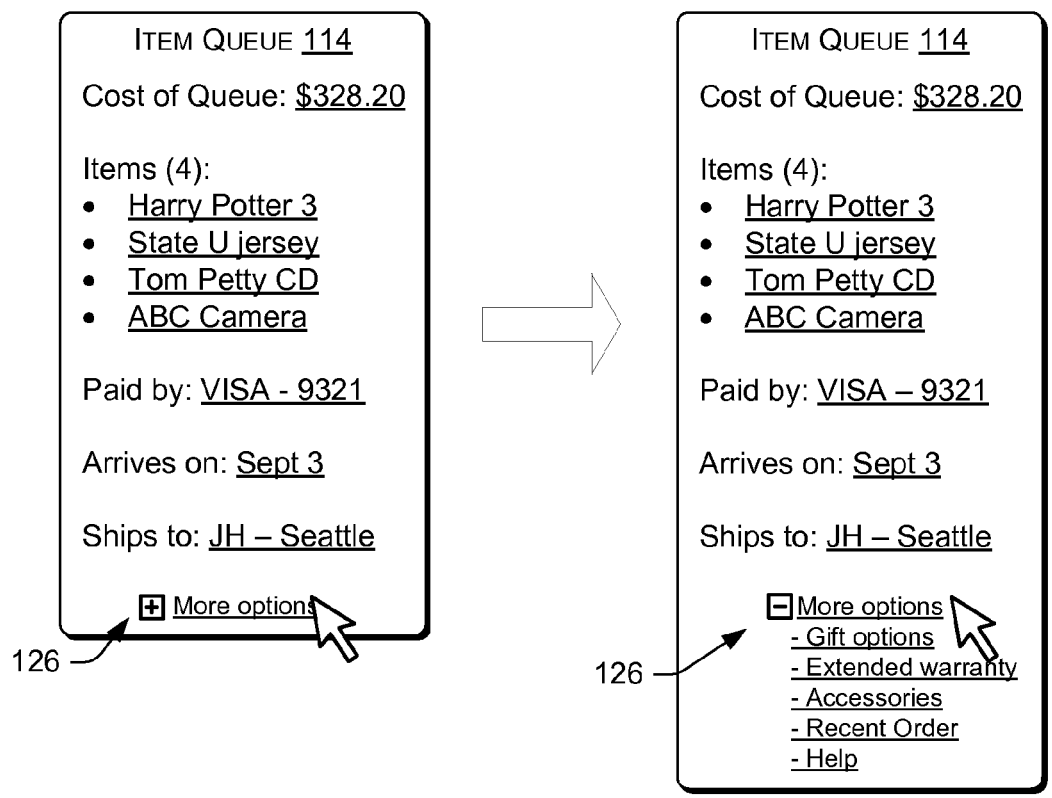
FIG. 9 is a schematic diagram showing an illustrative example of information that may be shown in the item queue of FIG. 1, upon user request for more information about the queue.

FIG. 9 is a schematic diagram showing details of item queue 114 following user selection of the "more options" line item 126. When the user selects this line item 126, a list of additional options is presented to the user. The list of other options is limitless and may include, without limitation, gift options, extended warranty options, accessories, recent orders, and help, to name just a few.

Examples of Aggregating Transactions

In the streaming ordering processes described herein, purchases are requested on an item-by-item basis. Once a user requests to purchase an item, it will be added to the item queue. The user may add additional items to the queue and/or modify the queue at any time. Items in the queue may be fulfilled as they are added to the queue (i.e., substantially continuously), periodically (e.g., every day at a predetermined time), or in some other fashion. Also, purchase requests may be fulfilled individually or may be aggregated. However, using the foregoing techniques, all of this can be done by the seller behind the scenes entirely transparently to the customer.

In some examples, individual purchase requests may be aggregated to apply various promotions, such as multi-item discounts, threshold-based shipping discounts, etc. In such cases, the cost of queue presented on the item detail page may be a fully landed cost, taking into account previous purchases. Numerous different promotions are possible using aggregation of purchase requests.

One promotional offer is described with reference to FIGS. 1, 5, 10, and 11. As shown by the promotional offer 112 in FIG. 1, the ABC 5.0 Mega Pixel Digital Camera is eligible for free shipping with the purchase of an accessory item. In this example, assume that at the time of the purchase of the camera, the user has not purchased any qualifying accessories. Thus, the user is not entitled to the free shipping offer at the time the camera is purchased (as shown by the "--" adjacent the promotions line item in FIG. 5).

Figure 10:
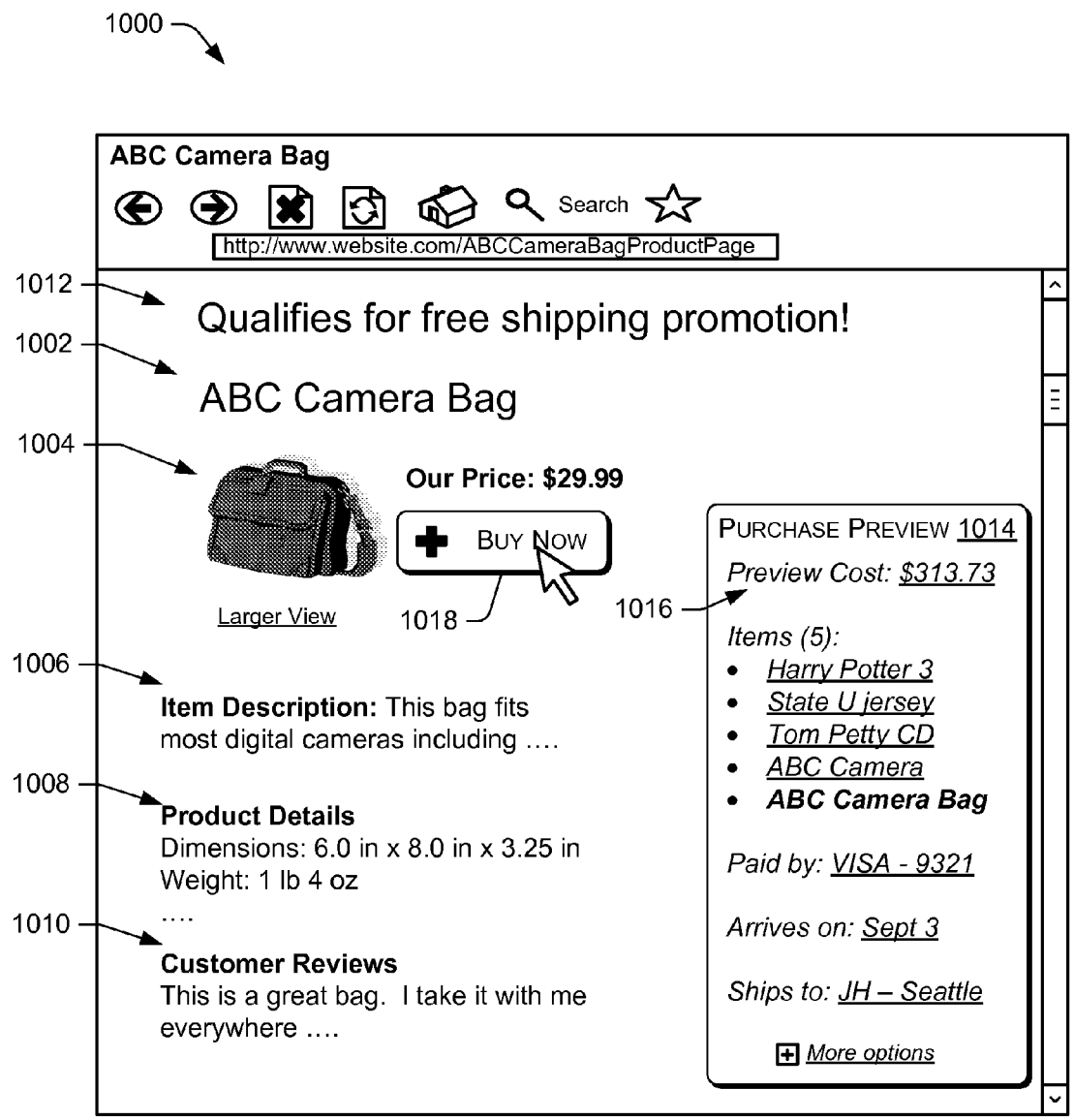
FIG. 10 is a schematic diagram of another illustrative item detail page associated with a second or subsequent item available for purchase, the item detail page including a purchase preview presenting information about a potential purchase of the second or subsequent item.

Referring now to FIG. 10, assume that the user navigates to an item detail page 1000 of an ABC Camera Bag. In addition to a title 1002, a picture 1004, a description 1006, product details 1008, and customer reviews 1010, the detail page 1000 includes an announcement 1012 indicating that the camera bag is an accessory that qualifies for the free shipping promotion associated with the ABC 5.0 Mega Pixel Digital Camera.

The item detail page 1000 also includes a purchase preview 1014, which includes, among other things, a cost of queue line item 1016 for the queue as if the camera bag were added to the queue. Note that at this point, the user has not yet selected the purchase interface 1018 to make a purchase request. Rather, the purchase preview may be presented as the default view when the user navigates to the page, or may be presented when the user hovers a pointer over the purchase interface. To add the camera bag to the queue 1014, the user still must click or otherwise select the purchase interface 1018 before the camera bag will actually be added to the queue. Because, in this example the orders have been aggregated, the cost of queue after adding the camera bag is based in part on the previous order of the ABC 5.0 Mega Pixel Digital Camera. Accordingly, the cost of queue line item 1016 has been reduced in accordance with the digital camera promotional offer. The details and extent of the price reduction are best shown with reference to FIG. 11.

Figure 11:
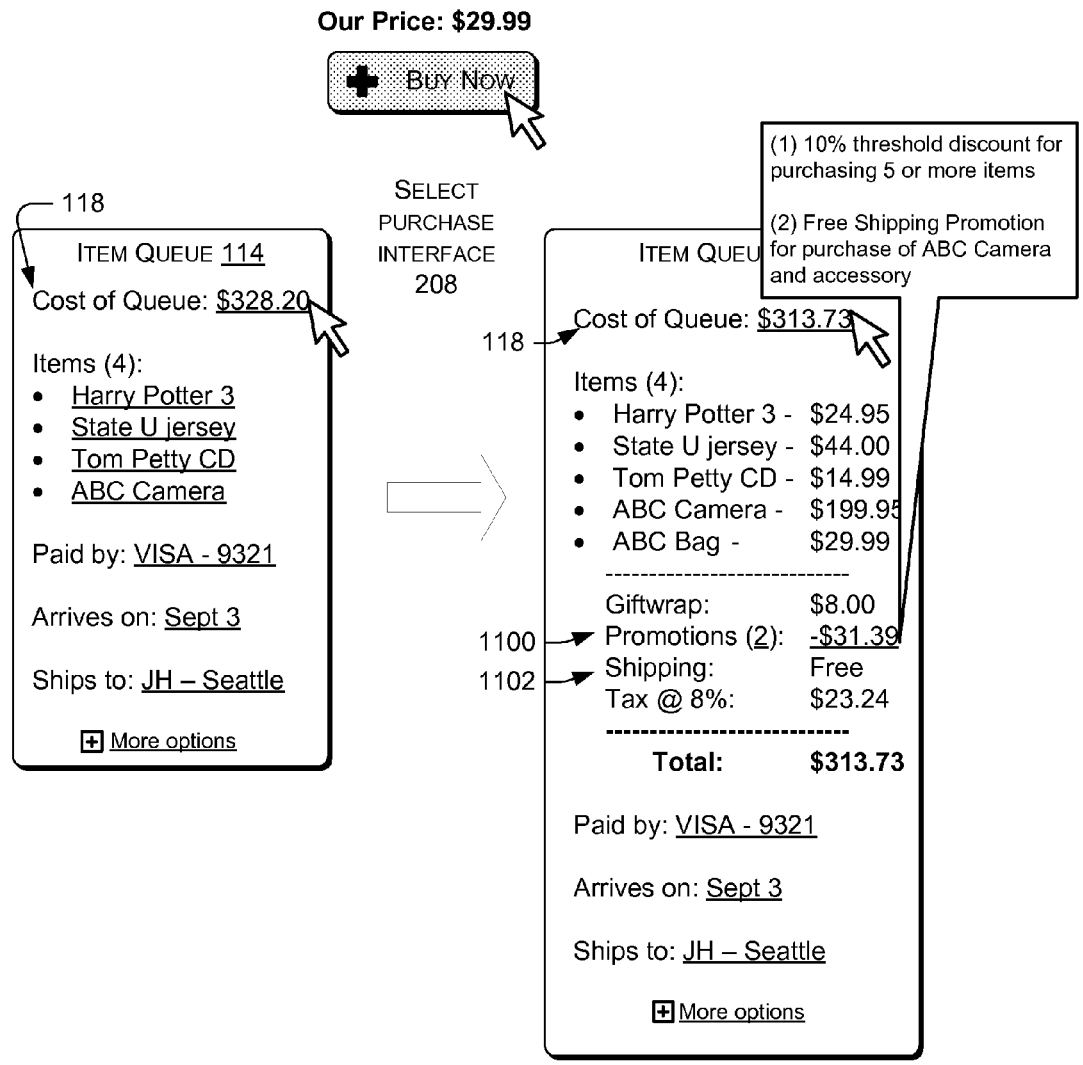
FIG. 11 is a schematic diagram showing an illustrative example of information that may be shown in the item queue of FIG. 10, upon user selection of a total cost of the queue.

FIG. 11 is a schematic diagram showing details of item queue 1014 following user selection of the cost of queue line item 1016. User selection of the cost of queue line item 1016 causes a detailed summary of the item cost to be displayed. As shown, the entire queue is entitled to two promotional discounts: a 10% threshold discount for purchasing five or more items within a predetermined period, and free shipping for purchasing an ABC camera and an accessory eligible for the free shipping promotion. Selecting the promotion line item 1100 brings up an explanation of the applicable promotion(s). In the illustrated case, the explanation describes that the promotions are a 10% threshold discount and a free shipping promotion for the digital camera. The order number and/or other identifying information may also be listed for convenience. In addition to the $31.39 credit for the 10% threshold discount, the shipping cost of the shipping line item 1102 indicates that shipping for the queue is free. Applying the foregoing promotions, the total charge for items in the queue is only $313.73. Thus, in this example, the total charge for the queue after adding the camera bag is actually less than before adding the camera bag.

Threshold based discounts may be applied as an item discount as described above, or as a threshold shipping discount. In the latter case, for the first item a customer purchases, which is below the free shipping threshold, the shipping costs are included in the total charge for the items in the queue. Upon visiting the detail page of a second item, which would push the customer over the free shipping threshold, the shipping charges for the queue would be reduced by the applicable shipping promotion. The application of the promotion may be automatic, and the customer would simply see a dramatic reduction in the total charge for the queue. If the promotion applies to previously fulfilled orders, the customer may even receive a credit or be paid for purchasing a subsequent item (e.g., if the amount already paid for shipping exceeds the value of the item that put the customer over the threshold shipping amount).

Other Illustrative Transaction Information

As mentioned above, transaction information may include any information useful to a customer when determining whether to purchase an item. FIG. 12 is a schematic view of an item detail page 1200 for an athletic jersey shirt, having additional/alternative transaction information 1202 and 1204 presented. This implementation is similar to that shown in FIG. 1, except that the item queue 1206 is presented directly on the item detail page 1200 in a frame of the page. Additionally, in this implementation the transaction information includes information about item options. Specifically, in this example, the transaction information includes a size line item 1202 and a color line item 1204. In this example, the user is given the option to change the size and color by selecting the desired size and color from the drop-down menu adjacent each line item. However, these items could alternatively be changed by any other suitable selection method (e.g., clicking, hovering over, etc.).

Illustrative Search Results Page

In the examples of FIGS. 1-12, transaction information is shown displayed on an item detail page. However, in other implementations, the item queue and fully landed cost of the same may be presented at other locations early in the buying process. For example, transaction information may be presented on a search results page, index page, tag page, forum page, or other page associated with one or more items. In that case, upon viewing the search results or other page associated with the one or more items, the user will have all the information he or she needs to make a buying decision. Transaction information may be provided for any one or more of the entries returned in the search results. Thus, customers may request purchases be added to the item queue directly from the search results or other page associated with the one or more items, without any additional page transitions.

Figure 13:
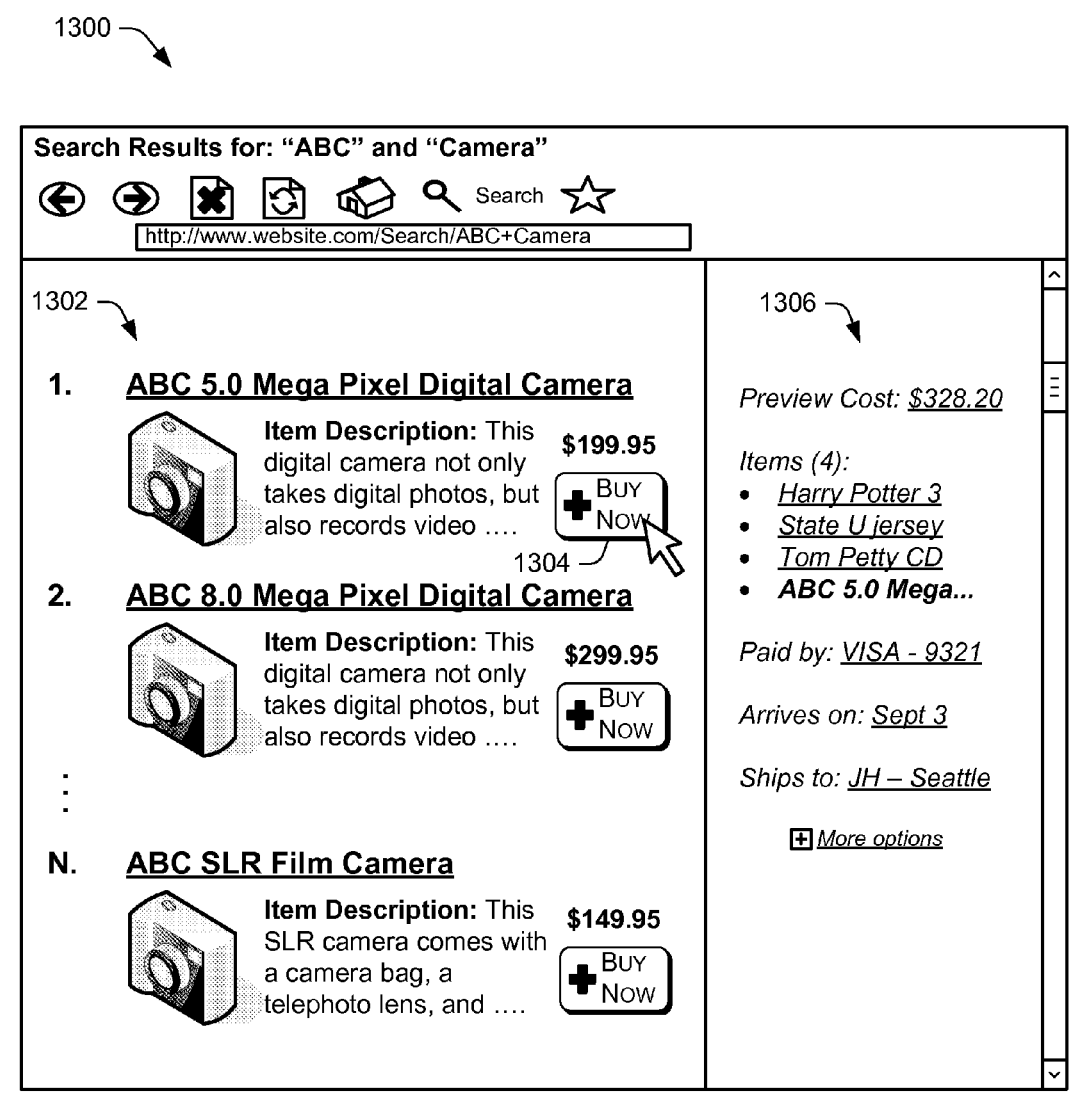

FIG. 13 is a schematic diagram of an illustrative search results page 1300, with an item queue presented alongside search results. Except for provision of the item queue, the search results page 1300 is of the sort that may be displayed in response to a user performing a search of a seller's catalog of items. The search results include a list of entries 1302 corresponding to items matching the search terms (in this case "ABC" and "camera") entered by the user. In addition to an item name, picture, and/or description, each entry 1302 in the list may be accompanied by a purchase interface 1304, such as a "buy now" button, usable by a user to make a purchase request. Additionally, an item queue may be presented on the search results page showing transaction details for items from previous purchase requests and/or a purchase preview 1306 may be presented showing a preview cost of what the total cost of the items in the queue would be if a particular item were added to the queue. For example, in FIG. 13, the purchase preview 1306 is shown providing a preview of the queue and fully landed cost of the queue if the ABC 5.0 Mega Pixel Digital Camera were added to the queue.

Transaction details that may be displayed in the queue include any information that would be useful to a user in making a buying decision including, for example, fully landed cost, payment method, arrival date, shipping address, or any other transaction information discussed herein. Thus, a customer knowing the item he or she is looking for, can easily browse the search results and purchase the desired item by selecting the purchase interface 1304 corresponding to the desired item directly from the search results page 1300.

The transaction information can be modified and/or additional transaction details viewed by selecting the information of interest in any of the manners described herein. For example, by selecting (e.g., hovering the cursor over) the cost of queue line item 1308, a detailed breakdown of the total charge can be displayed, as shown in FIG. 5. In addition, if the user wishes to view more information about the item, the user can simply select the item entry from the search results list to view an item detail page for the item in a conventional manner.

Illustrative Merchant Store System Architecture

Various techniques for moving transaction information forward and for presenting an item queue are described in the context of an e-commerce merchant website. One illustrative implementation of this context is described below. However, moving transaction information forward may also be implemented in other contexts. Moreover, other shopping techniques may be performed by the illustrated architecture.

Figure 14:
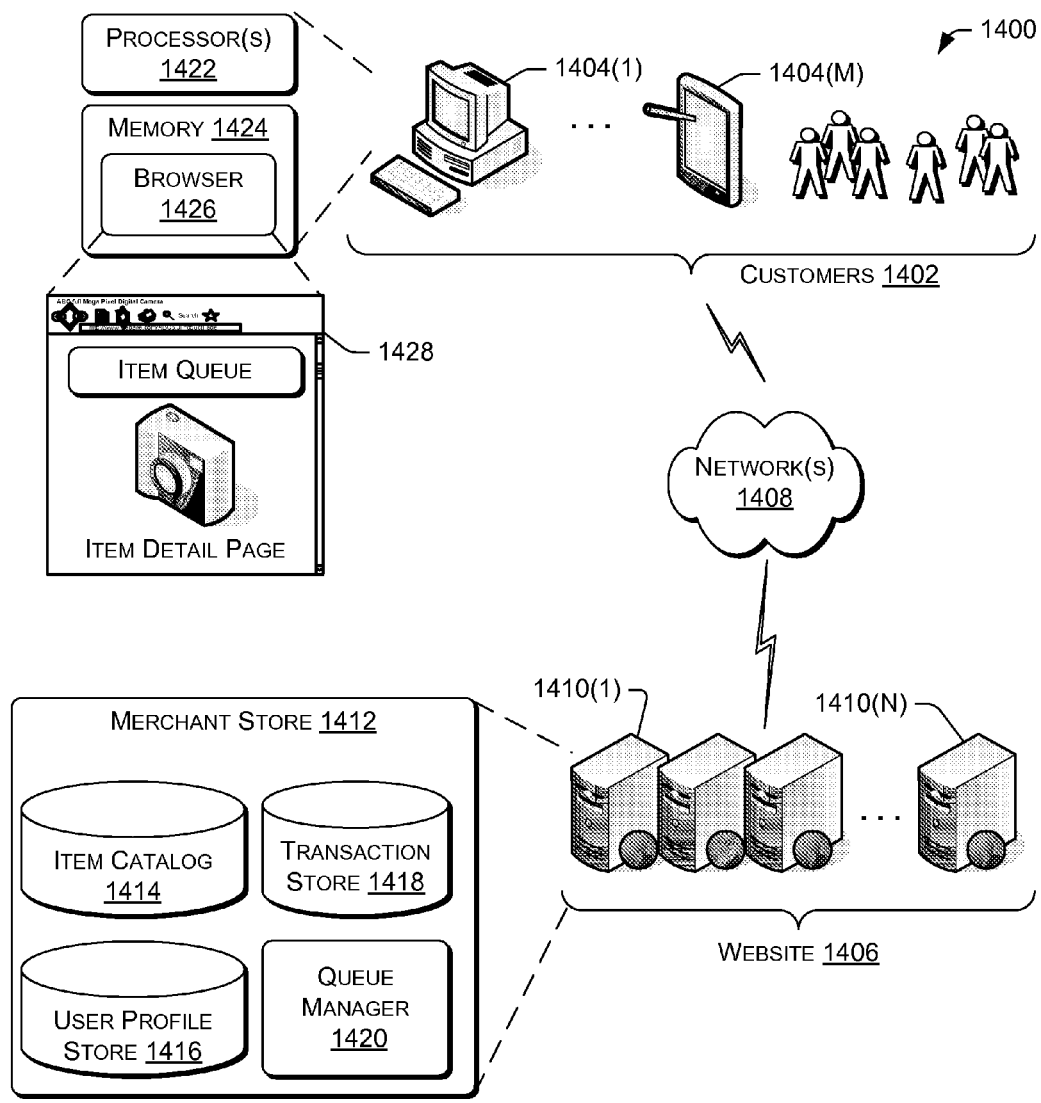
FIG. 14 is a schematic diagram of an illustrative system including an illustrative e-commerce merchant website usable to move transaction details forward in the buying process.

FIG. 14 illustrates an example architecture 1400 usable to facilitate streaming ordering in the context of an e-commerce merchant website. In the architecture 1400, customers 1402 may utilize user computing devices 1404(1), . . . , 1404(M) to access a website 1406 via a network 1408. The network 1408 represents any one or combination of multiple different types of networks, such as cable networks, the Internet, and wireless networks.

One or more servers 1410(1), . . . , 1410(N), perhaps arranged in a cluster or as a server farm, host the website 1406 or another type of information server. Other server architectures may also be used to host the website 1406. The website 1406 is capable of handling requests from many users and serving, in response, various web pages that can be rendered at the user computing devices 1404(1)-(M). The website 1406 can be any type of website that supports user interaction, including online retailers, informational sites, social networking sites, blog sites, search engine sites, news and entertainment sites, and so forth.

In the illustrative environment, the website 1406 represents a merchant website that hosts an electronic catalog with one or more items available for purchase. An item includes anything that the merchant wishes to offer for purchase, rental, subscription, viewing or some other form of consumption that includes a payment to the merchant in exchange for the item, use of the item for a certain amount of time, and/or the like. In some implementations, the item may be offered by the merchant for consumption. However, in some implementations, the merchant may host items that others are selling using the merchant's website. As mentioned above, an item can include, for example, a product, a service, a digital download, a news clip, a user profile, customer-created content, information, or some other type of sellable or non-sellable unit.

In FIG. 14, a merchant store 1412 is implemented in memory of one or more of the servers 1410. The merchant store 1412 comprises an item catalog 1414 of items that are available for purchase. The item catalog stores an item detail page for each item in the catalog. The merchant store 1412 also includes a user profile store 1416 and a transaction store 1418. The user profile store 1416 includes information about customers, such as customer account information, billing information, address book information, and other information associated with the customer. The transaction store 1418 is in communication with the user profile store 1416, and includes information about user purchases and other transactions.

The merchant store 1412 also includes a queue manager 1420, which is responsible for managing operations and communications between the item catalog 1414, the user profile store 1416, and the transaction store 1418. As described in more detail below, the queue manager 1420 populates queues of items from previous purchase requests along with appropriate transaction information on item detail pages, search pages, or other pages, such as those depicted in FIGS. 1, 10, 12, and 13 described above.

As discussed above, customers may purchase items via the website 1406 using computing devices 1404(1)-(M). The user computing devices 1404(1)-(M) may be implemented as any number of computing devices, including as a personal computer, a laptop computer, a portable digital assistant (PDA), a mobile phone, a set-top box, a game console, and so forth. As illustrated, each user computing device is equipped with one or more processors 1422 and memory 1424 to store applications and data. According to some embodiments, a browser application 1426 is shown stored in the memory 1424 and is executable on the processor(s) 1422 to provide access to the website 1406. The browser 1426 renders web pages served by the website 106 on an associated display. Although embodiments are described in the context of a web-based system, other types of client/server-based communications and associated application logic could be used.

Figure 15:
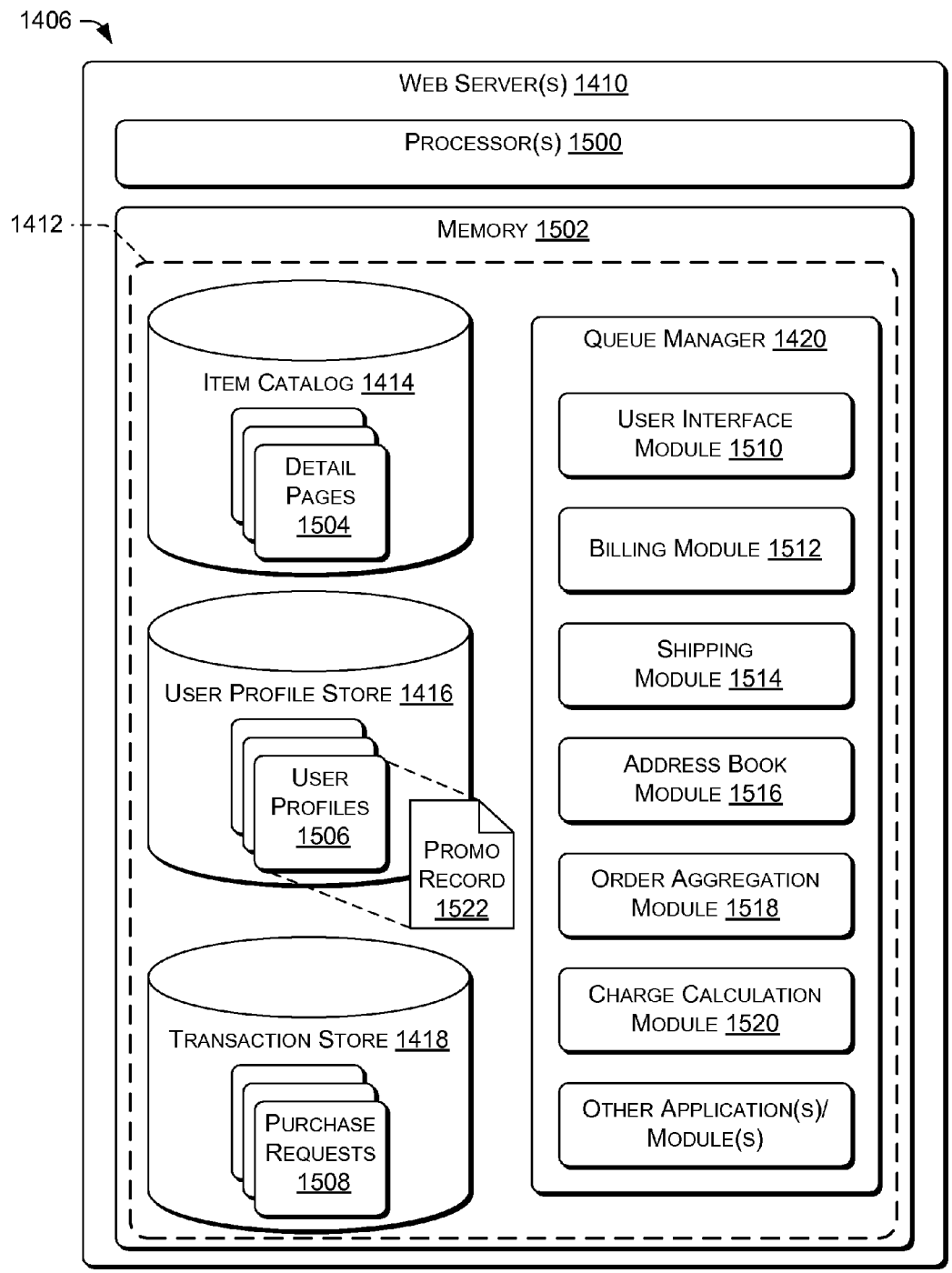
FIG. 15 is a schematic diagram of the illustrative merchant web site of FIG. 14 in more detail.

FIG. 15 illustrates the merchant website 1406 in more detail. As shown in FIG. 15, the merchant website 1406 comprises one or more web servers 1410. Each web server 1410 includes one or more processors 1500 and memory 1502. Memory 1502 may include volatile memory (such as RAM), nonvolatile memory, removable memory, and/or non-removable memory, implemented in any method or technology for storage of information, such as computer-readable instructions, data structures, program modules, or other data. Also, the processor(s) 1500 may include onboard memory in addition to or instead of the memory 1502. Some examples of storage media that may be included in memory 1502 and/or processor(s) 1500 include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the processor(s) 1500.

The item catalog 1414, the user profile store 1416, the transaction store 1418, and the queue manager 1420 are stored in memory 1502 (collectively shown as merchant store 1412). As shown in FIG. 15, the item catalog 1414 includes a plurality of item detail pages 1504, such as those shown in FIGS. 1, 10, and 12, for example. As also shown in FIG. 15, the user profile store 1416 includes a plurality of user profiles 1506, and the transaction store includes records of previous orders 1508. The order records 1508 contain specifics of customers' orders, such as an identification of items purchased, price, payment method, shipping and billing address, gift status, and the like. Alternatively, instead of containing user-specific information, the order records 1508 may reference or point to one or more user profiles 1506 that contain such information.

Queue manager 1420 includes a variety of application program modules usable to implement the merchant website 1406. A user interface module 1510 serves as an interface with the user computing devices 1404. When a user (e.g., one of the customers 1402) accesses the website 1406, the user computing device 1404(1) submits a request, such as in the form of a uniform resource locator (URL), to the servers 1410(1)-(N). Upon receiving the request, the user interface module 1510 returns an appropriate web page 1428 back to the requesting client computer. In the context of a merchant website, the returned web page 1428 may comprise an item detail page, from which a customer may purchase an item associated with the detail page. Along with the detail page, the queue manager 1420 also provides an item queue 114 including a list of items from previous purchase requests. The queue manager 1420 may also present one or more pieces of transaction information, such as a source of payment, arrival date, shipping information, and a total cost of the item including tax, shipping, and any applicable promotional offers. An example of such transaction information is shown in FIG. 1.

Upon receiving a request to view an item detail page, a billing module 1512 of the queue manager queries the user profile store 1416 for a user profile of the requesting user. If a corresponding user profile is found, the billing module 1512 reads any credit card information or other billing information from the user profile and uses this information to populate the source of payment line item 120 in the item queue 114 of FIG. 1. Additionally or alternatively, the billing module 1512 may query the transaction store 1418 for any previous orders 1508 by the requesting customer to populate the item queue 114.

A shipping module 1514 of the queue manager may then query the user profile store 1416 and/or the transaction store 1418 for information regarding the requesting user's preferred shipping speed. For example, the user's profile 1506 may include a setting indicating the user's preferred shipping speed. Additionally or alternatively, one or more previous orders 1508 placed by the user may be used to anticipate the user's shipping preference. The shipping module 1514 then uses the information obtained by these queries to populate the arrival date line item 122 in the item queue 114. If the user's preferred shipping speed is not determined, the shipping speed may be set to a default (e.g., overnight, 2-day, 3-day, ground, etc.).

An address book module 1516 of the queue manager may be used to populate the shipping address information line item 124 in the item queue 114 of FIG. 1. In one example, the address book module 1516 may query the user profile store 1416 and/or the transaction store 1418 for a list of addresses to which the user has previously had items delivered. Such information may be stored as a list of shipping addresses in the user's profile 1506 and/or may be obtained from shipping addresses of previous purchase requests 1508 placed by the user.

An order aggregation module 1518 and a charge calculation module 1520 work together with the shipping module 1514 and address book module 1516 to determine a total charge for the items in the queue, including tax, shipping, and any applicable discounts or promotions. In particular, the order aggregation module 1518 aggregates all orders placed by the user within a relevant time period, and determines if any combination of the purchase requests qualify for any promotions (e.g., multiple item discounts, threshold-based shipping discounts, etc.). The charge calculation module 1520 then determines, based on the specified shipping address, a sales tax rate applicable to the purchase request. The charge calculation module 1520 then adds the list price of the items in the queue, the applicable sales tax, the shipping charges, any applicable promotional offers, and any other handling charges (e.g., gift wrapping charges), to arrive at a total cost to purchase the items in the queue.

Additionally or alternatively, the user profile store 1416 and/or the transaction store 1418 may include a current qualifying promotion record 1522, which includes a list of all current promotions for which a user is eligible or has partially completed. In some implementations, the promotion record or promo record 1522 may be a part of each user's profile 1506. The promo records 1522 are different from the order records 1508 in that they reflect an upfront determination of promotions for which the user is eligible for or has partially completed. That is, a promo record 1522 could be generated as soon as a customer made a purchase request for a first item that is eligible for some sort of promotion, such as the digital camera in FIG. 1. Using such a promo record 1522, the system need not query or even have access to previous purchase requests 1508 of the user.

The queue manager 1420 may also include one or more other applications or modules to perform a variety of other administrative functions as necessary or desired.

Various instructions, methods and techniques described herein may be considered in the general context of computer-executable instructions, such as program modules, executed by one or more computers or other devices. Generally, program modules include routines, programs, objects, components, data structures, etc. for performing particular tasks or implementing particular abstract data types. These program modules and the like may be executed as native code or may be downloaded and executed, such as in a virtual machine or other just-in-time compilation execution environment. Typically, the functionality of the program modules may be combined or distributed as desired in various implementations. An implementation of these modules and techniques may be stored on or transmitted across some form of computer-readable media.

Illustrative Intermediary Architecture

Figure 16:
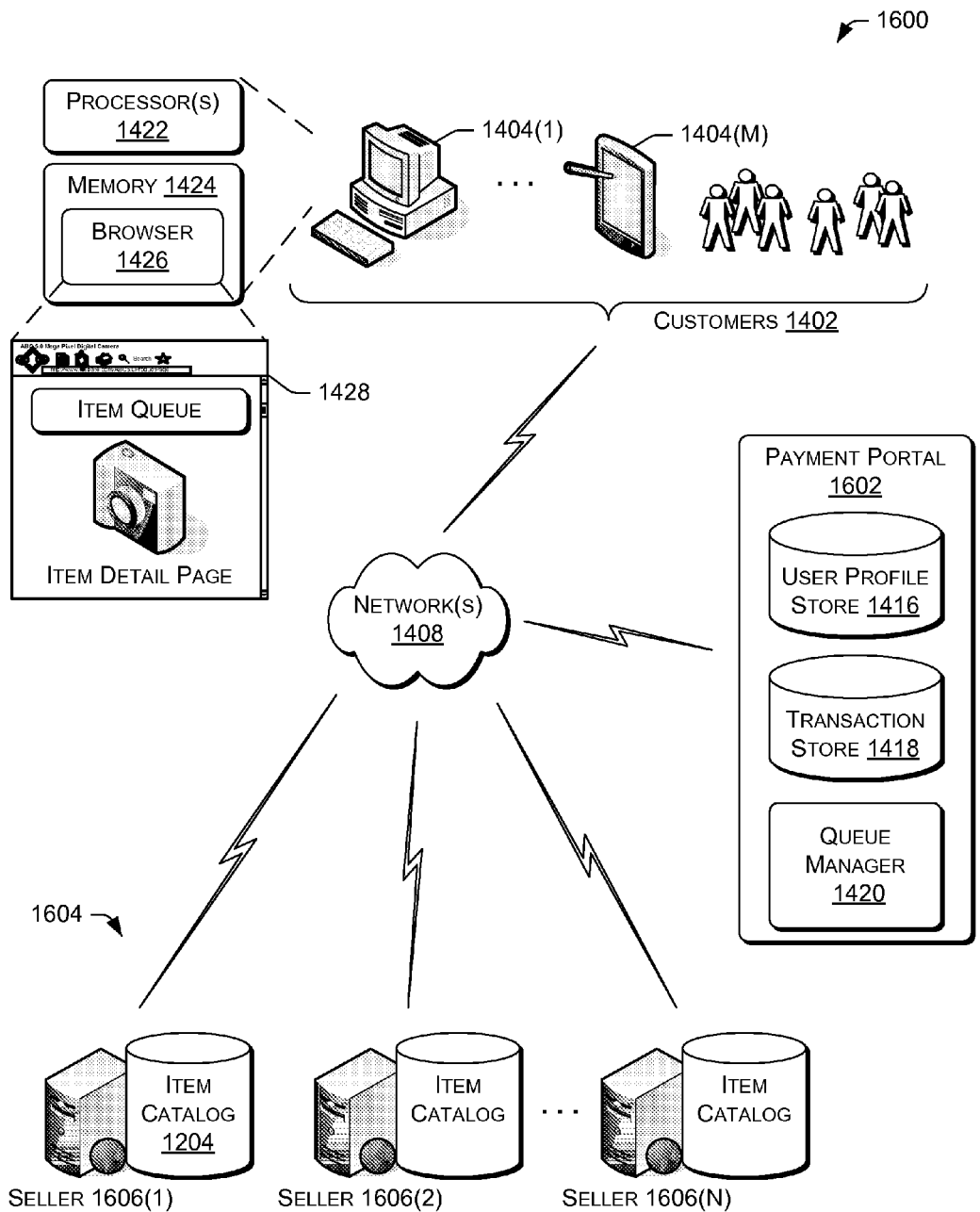
FIG. 16 is a schematic diagram of an illustrative system including an illustrative intermediary entity usable to move transaction details forward in the buying process.

FIG. 16 illustrates another architecture 1600 usable to move transaction details forward and to present a queue of items, in the context of an intermediary entity, such as a third party payment portal 1602. In this implementation, a customer shops with one or more independent sellers 1604. Purchase requests made with these sellers are handled by the third party payment portal 1602. Thus, the payment portal 1602 serves as an intermediary between the customer and the seller. By virtue of this arrangement, the payment portal 1602 is able to achieve the techniques described herein across multiple different sellers. In some respects, components and functions of the architecture 1600 are the same or similar to those described above with respect to merchant store architecture 1400. Components that are the same or similar to those in architecture 1400 are designated by the same reference characters and further description of those items has been omitted for brevity.

In FIG. 16, the client side portion of the architecture is the same as that shown and described with respect to FIG. 14. Customers 1402 may utilize user computing devices 1404(1), . . . , 1404(M) to access seller websites 1604 via a network 1408. The seller websites 1604 may be hosted by or on behalf of any number of different sellers 1606(1), 1606(2), . . . , 1606(N). Each seller may maintain an item catalog 1404 of items available for purchase. However, in this implementation, once a user determines to order an item, the user is directed to the third party payment portal 1602 for completion. This transition from the seller website 1604 to the payment portal 1602 may be done seamlessly (i.e., not apparent to the user), or the user may be given a different interface informing the user of the transfer to the payment portal 1602. Additionally or alternatively, the transition to the payment portal 1602 may occur at any stage of the buying process before or after the user selects the "buy" button or other purchase interface. In still other alternatives, the transaction may be completed on the seller's website 1604 and the transaction information may subsequently be transmitted to the payment portal 1602 for processing (rather than transitioning the user to the payment portal 1602 during ordering).

In one illustrative implementation, the seller website 1604 receives a request from a user to view an item detail page of the item catalog 1404. The seller website 1604 then queries the payment portal 1602 to determine a queue of items from previous purchase requests by the user. The seller website 1604 may also query the payment portal 1602 for one or more pieces of transaction information, such as a source of payment, arrival date, shipping information, and a total cost of the item including tax, shipping, and any applicable promotional offers. A queue manager 1420 of the payment portal 1602 may determine the item queue and/or transaction information in much the same way as the merchant store example described above. The payment portal 1602 transmits the item queue and/or transaction information to the seller website 1604 and the seller website 1604 in turn serves the requested item detail page to the user along with the item queue and pertinent transaction details.

Additionally or alternatively, the seller web site 1604 may maintain a user profile store including a promotional record, such as promo record 1522, indicating promotions for which users are eligible. In that case, the seller website 1604 may base the total cost at least in part on the promo record or other user profile information stored at the seller website 1604.

The foregoing intermediary architecture 1600, may be used to facilitate ordering across multiple different sellers. Such ordering may allow an entity hosting the payment portal 1602 to apply promotions independently of the sellers. The payment portal entity may offer a discount for purchases from any sellers that use the payment portal entity exceeding a certain threshold in terms of number of items, monetary value, and/or number of orders. For example, a credit card company as the intermediary entity, may offer a cash back award, a discounted financing rate, or some other promotion if a customer's purchases exceed a certain spending threshold in a period of time. The promotion may be applied to past, present, and/or future purchases by the customer.

Alternatively, streaming ordering using an intermediary may allow one or more of the sellers to offer competitive discounts. For example, if seller 1606(1) and seller 1606(2) offer competing products A and B, respectively. Seller B may offer a discount on a new version of product A if the customer forfeits his or her existing version of product B. Because the payment portal 1602 maintains transaction records in transaction store 1418 and/or promo records in user profile store 1416, the payment portal 1602 can keep track of items users have purchased from different sellers. Based on this information, the payment portal 1602 may notify sellers 1606(1)-1606(N) of customers who have purchased competing products in the past, thereby allowing the sellers to offer incentives for the user to switch to their product.

Illustrative Streaming Ordering Methods

Figure 17:
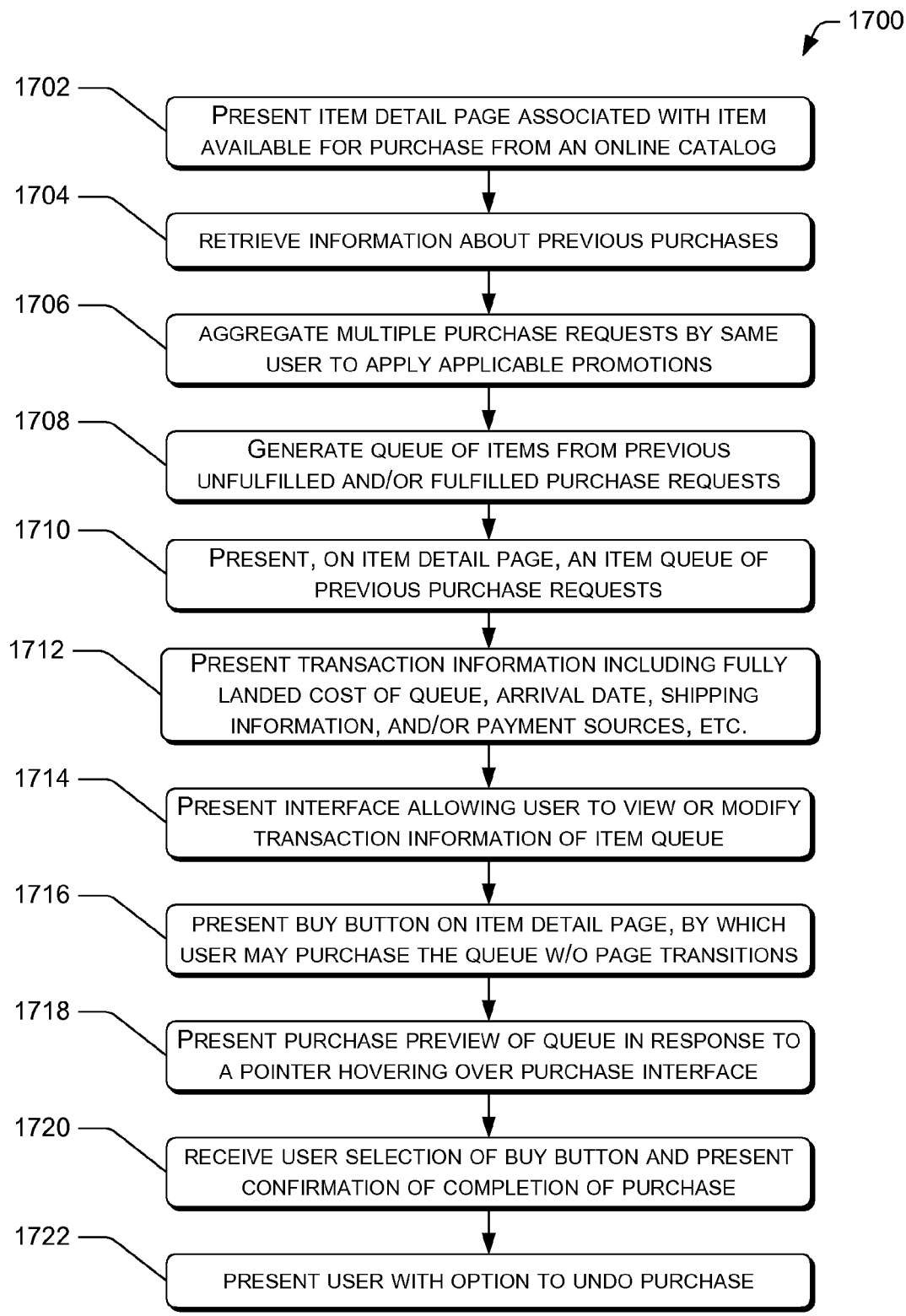
FIG. 17 is a flowchart of an illustrative method of moving transaction details forward in the buying process.

Various techniques and environments for moving transaction details forward in the buying process are described above. FIG. 17 is a flowchart showing one illustrative method 1700 of moving transaction details forward that may, but need not, be implemented using the architectures shown in FIGS. 14-16. The method 1700 will be described in the context of the architecture of FIGS. 14 and 15 for convenience and clarity. In some variations, the method 1700 may be used to implement the ordering experience shown and described with reference to FIGS. 1-13.

At 1702, the user interface module 1510 of the queue manager presents an item detail page, search results page, or other page associated with an item available for purchase from an online catalog. The item detail page may be presented in response to a request by a user's computer to load the specified item detail page. At 1704, the queue manager 1420 queries the transaction store 1418 and/or user profile store 1416 to retrieve information about previous purchases by the user. At 1706, the order aggregation module 1518 then aggregates one or more previous purchase requests by the customer. At 1708, the queue manager 1420 generates a queue of items from previous purchase requests and, at 1710, presents the queue of previous purchase requests on the item detail page. In some implementations, the queue is made up of items from pending, unfulfilled purchase requests. However, in other implementations, the queue may include items from unfulfilled and/or fulfilled purchase requests.

At 1712, one or more pieces of transaction information are presented by the billing module 1512, the shipping module 1514, the address book module 1516, and/or the charge calculation module 1520 of the queue manager 1420 along with the item detail page. In some implementations, the transaction information may include a total cost including tax and shipping costs, an arrival date, shipping information, a payment source, gift options, quantity of the item, color of the item, model of the item, service plan options, shipping insurance options, and/or billing address options. In some implementations, the total cost may comprise a fully landed cost of the items in the queue, which is based at least in part on one or more previous purchases by a user.

In response to user selection of the total cost, arrival date, shipping information, or source of payment, the user interface module may, at 1714, present an interface allowing the user to view or modify details of the selected one of the total cost, arrival date, shipping information, or source of payment.

At 1716, a buy button or other purchase interface is presented on the item detail page. A user may purchase preview a purchase by hovering a pointer over the buy button or other purchase interface. At 1718, a purchase preview is presented in response to a pointer hovering over the purchase interface. A user may purchase the queue of items associated with the item detail page (or a subset thereof) by selecting the buy button or other purchase interface. In some implementations, user selection of the buy button completes the purchase of the queue of items (or subset of the queue) without any page transitions. Selection of the purchase interface is received at 1720, and a confirmation message is presented, confirming completion of the purchase. At 1722, the user is presented with an undo link, which enables the user to undo the purchase after the purchase is completed.

If the user subsequently navigates to a second or subsequent item detail page, the user interface module 1510 presents a second or subsequent item detail page in a similar manner to that described above.

In some implementations, the foregoing method 1700 is operable without specialized shopping cart and checkout-specific screens. Instead a user is able to shop for items one at a time and may stop shopping at any point without the need to check out in order to place an order. That is, each purchase request constitutes a complete transaction that will be fulfilled alone or in combination with one or more other purchase requests by the user.

Certain acts in method 1700 need not be performed in the order described, may be modified and/or may be omitted entirely, depending on the circumstances. For example, the method 1700 may include presentation of any number of item detail pages. Moreover, in some implementations, the item detail pages may be presented with limited transaction information, or the transaction information may be omitted entirely. In still other examples, the purchase preview 1718 and/or confirmation message may be modified, presented in a different order, and/or omitted entirely.

Moreover, any of the acts of any of the methods described herein may be implemented at least partially by a processor or other computing device based on instructions stored on one or more computer-readable media. Computer-readable media can be any available media that can be accessed by a preprocessing system, display device, and/or digital work, as appropriate. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by the preprocessing system, display device, and/or digital work. Combinations of the any of the above should also be included within the scope of computer-readable media.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims. For example, the methodological acts need not be performed in the order or combinations described herein, and may be performed in any combination of one or more acts.

What is claimed is:

1. A method implemented at least partially by a computing device, the method comprising:
   presenting an item detail page associated with an item available for purchase;
   generating by the computing device, without first completing a transaction to purchase the item available for purchase, a preview queue of items from previous purchase requests, the previous purchase requests including previously completed transactions, the preview queue of items also including the item available for purchase as if the transaction to purchase the item available for purchase were one of the previously completed transactions, the preview queue of items including a preview fully landed cost, the preview fully landed cost including a fully landed cost associated with the previously completed transactions, the preview fully landed cost also including at least one or more costs associated with the item available for purchase;
   causing presentation, by the computing device, of the preview queue of items on the item detail page, the preview queue of items including the preview fully landed cost; and
   causing presentation of a purchase interface on the item detail page selectable to purchase the item available for purchase.

2. The method of claim 1, wherein the preview queue of items is caused to be presented in response to receipt of an indication that a pointer is hovered over the purchase interface.

3. The method of claim 1, wherein the preview fully landed cost comprises a total cost of the items in the preview queue including tax and shipping cost as if the transaction to purchase the item available for purchase were one of the previously completed transactions.

4. The method of claim 1, further comprising causing presentation, on the item detail page, of at least one of a total cost of the fully landed cost associated with the previously completed transactions, an arrival date associated with the previously completed transactions, shipping information associated with the previously completed transactions, or a source of payment for the preview queue of items associated with the previously completed transactions.

5. The method of claim 4, further comprising causing presentation of the preview queue of items on the item detail page in response to receipt of user input indicating selection of at least one of the total cost of the fully landed cost associated with the previously completed transactions, the arrival date associated with the previously completed transactions, the shipping information associated with the previously completed transactions, or the source of payment associated with the previously completed transactions.

6. The method of claim 5, wherein the item detail page is interactive to enable the user to modify details of the selected at least one of the total cost associated with the previously completed transactions, the arrival date associated with the previously completed transactions, the shipping information associated with the previously completed transactions, or the source of payment associated with the previously completed transactions.

7. The method of claim 1, further comprising causing presentation, on the item detail page, of the fully landed cost associated with the previously completed transactions, wherein the fully landed cost associated with the previously completed transactions reflects a threshold-based promotion offering a discount for the purchase of at least a threshold quantity or value of items, such that the fully landed cost caused to be presented on the item detail page is reduced in accordance with the threshold-based promotion.

8. The method of claim 1, further comprising:
causing presentation, on the item detail page, of the fully landed cost associated with the previously completed transactions;
recognizing a purchase request for the item available for purchase in response to selection of the purchase interface; and
updating the fully landed cost associated with the previously completed transactions to include the one or more costs associated with the item available for purchase.

9. The method of claim 1, further comprising recognizing a purchase request for the item available for purchase in response to selection of the purchase interface, and causing presentation of a purchase confirmation message on the item detail page.

10. The method of claim 9, further comprising causing presentation, on the purchase confirmation message, of an undo interface usable to undo the purchase after selection of the purchase interface.

11. A system comprising:
memory configured to at least store an item catalog, the item catalog including item details associated with an item available for purchase;
one or more processors;
one or more program modules stored on the memory and executable by the one or more processors to:
cause presentation of an item detail page including the item details associated with the item available for purchase; and
cause presentation on the item detail page of, without first completing a transaction to purchase the item available for purchase:
a preview queue of items from previous purchase requests, the previous purchase requests including previously completed transactions, the preview queue of items also including the item available for purchase as if the transaction to purchase the item available for purchase were one of the previously completed transactions, the preview queue of items including a preview fully landed cost, the preview fully landed cost including a fully landed cost associated with the previously completed transactions, the preview fully landed cost also including at least one or more costs associated with the item available for purchase; and
a purchase interface configured to enable purchase of the item available for purchase.

12. The system of claim 11,
wherein the memory is further configured to at least store information about previous orders placed by the user; and
wherein the one or more processors are further configured to at least aggregate the previous orders placed by the user.

13. The system of claim 12, wherein the previously completed transactions include one or more unfulfilled purchase requests.

14. The system of claim 11, wherein the memory is further configured to at least store user profile information.

15. A method implemented at least partially by a computing device, the method comprising:
presenting a page associated with an item available for purchase;
generating, by the computing device, a queue of items from previous purchase requests, the previous purchase requests constituting previously completed transactions;
causing, by the computing device, presentation of the queue of items on the page, the queue of items including a fully landed cost with respect to the previously completed transactions;
receiving a user input to the page;
generating, by the computing device, without first completing a transaction to purchase the item available for purchase, a purchase preview at least partly in response to receiving the user input to the page, the purchase preview showing a preview fully landed cost of the queue as if the item available for purchase were part of the queue; and
causing presentation of the purchase preview on the page.

16. The method of claim 15, wherein the received user input comprises an indicator that indicates a pointer hovered over a purchase interface displayed on the page, the purchase interface selectable to enable the user to initiate purchase of the item available for purchase.

17. The method of claim 15, wherein the fully landed cost comprises a total cost of the items in the queue including tax and shipping cost.

18. The method of claim 17, further comprising causing presentation of an arrival date, shipping information, and a source of payment for the queue of items on the page.

19. The method of claim 18, further comprising causing presentation of an interface in response to selection of the total cost, the arrival date, the shipping information, or the source of payment, the interface allowing the user to view or modify details of the selected one of the total cost, the arrival date, the shipping information, or the source of payment.

20. The method of claim 15, wherein the fully landed cost reflects a threshold-based promotion offering a discount for the purchase of at least a threshold quantity or value of items, such that the fully landed cost caused to be presented on the page is reduced in accordance with the threshold-based promotion.

21. The method of claim 15, further comprising:
causing presentation of a purchase interface on the page, by which the item available for purchase may be purchased;
recognizing a purchase request for the item available for purchase in response to selection of the purchase interface; and
updating the queue of items and the fully landed cost of the queue.

22. The method of claim 21, wherein after selection of the purchase interface, the queue is updated with zero page transitions.

23. The method of claim 15, further comprising:
causing presentation of a purchase interface on the page, by which the item available for purchase may be purchased;
recognizing a purchase request for the item available for purchase in response to selection of the purchase interface; and
causing presentation of a confirmation message on the page.

24. The method of claim 23, further comprising causing presentation on the confirmation message of an undo interface configured to enable undoing the purchase after selection of the purchase interface.

25. The method of claim 15, further comprising causing presentation of at least one of additional purchase information to a user, the additional purchase information including one or more of the following: gift options, quantity of the item, color of the item, model of the item, service plan options, shipping insurance options, or billing address options.

26. The method of claim 15, wherein the page associated with the item available for purchase comprises an item detail page.

27. The method of claim 15, wherein the page associated with the item available for purchase comprises a search results page.

28. A method implemented at least partially by a computing device, the method comprising:
causing presentation of a search results page in response to receipt of a search request, the search results page listing one or more items available for purchase;
generating, by the computing device, without completing a purchase of the one or more items available for purchase, a preview queue of items including a preview fully landed cost including a fully landed cost associated with previously completed transactions and at least one or more costs associated with a selected one of the one or more items available for purchase;
causing, by the computing device, presentation of the preview queue of items on the search results page, the preview queue of items including the preview fully landed cost; and
causing presentation of a purchase interface for the one or more items, by which a user may purchase the one or more items associated with the search results page.

29. The method of claim 28, wherein the preview queue of items is generated in response to receipt of an indicator indicating a hovering of a pointer over the purchase interface.

* * * * *